US008487927B2

(12) United States Patent
Ofek et al.

(10) Patent No.: US 8,487,927 B2
(45) Date of Patent: Jul. 16, 2013

(54) VALIDATING USER GENERATED THREE-DIMENSIONAL MODELS

(75) Inventors: Eyal Ofek, Redmond, WA (US); Pragyana Mishra, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1191 days.

(21) Appl. No.: 12/122,731

(22) Filed: May 19, 2008

(65) Prior Publication Data

US 2009/0284527 A1 Nov. 19, 2009

(51) Int. Cl.
*G06T 17/00* (2006.01)

(52) U.S. Cl.
USPC .......................................... 345/420; 345/419

(58) Field of Classification Search
USPC ................................. 345/420, 419
See application file for complete search history.

(56) References Cited

U.S. PATENT DOCUMENTS

| | | | |
|---|---|---|---|
| 6,111,582 A * | 8/2000 | Jenkins .......................... | 345/421 |
| 6,963,662 B1 | 11/2005 | LeClerc et al. | |
| 7,062,157 B2 | 6/2006 | Iwai et al. | |
| 2005/0063582 A1 | 3/2005 | Park et al. | |
| 2006/0110045 A1 | 5/2006 | Reissman | |
| 2006/0232583 A1 | 10/2006 | Petrov et al. | |
| 2007/0035831 A1 | 2/2007 | Gutierrez Novelo | |
| 2008/0024484 A1 | 1/2008 | Naimark | |

FOREIGN PATENT DOCUMENTS

WO 0004506 A1 1/2000

OTHER PUBLICATIONS

Ayromlou et al. "Probabilistic Matching of Image- to Model-Features for Real-time Object Tracking" Institute of Automation and Control, Vienna University of Technology, Vienna Austria; IEEE 2002; pp. 692-693.*

Reznik et al. "Implicit Shape Models, Model Selection, and Plane Sweeping for 3D Facade Interpretation" Institute of Photogrammetry and Cartography, Bundeswehr University Munich, Germany; International Archives of Photogrammetry, Remote Sensing and Spatial Information Sciences, Sep. 2007; pp. 175-176.*
Lee et al. "Automatic Integration of Facade Textures into 3D Building Models with a Projective Geometry Based Line Clustering" The Eurographics Association and Blackwell Publishers; Oxford UK; Eurographics 2002; p. 8.*
Kl-Hakim, "A Practical Approach to Creating Precise and Detailed 3d Models from Single and Multiple Views", IAPRS, vol. XXXIII, Amsterdam, Book 5A, Dated: 2000, pp. 202-209.
Ferryman, et al., "Learning Enhanced 3D Models for Vehicle Tracking", In P.H. Lewis and M.S. Nixon (eds.) British Machine Vision Conference, vol. 2, BMVA. (1998), pp. 873-882.
Enciso, et al., "Synthesis of 3d Faces", Dated: 1999, pp. 1-8.
Fua, et al., "Using 3-Dimensional Meshes to Combine Image-Based and Geometry-Based Constraints", Lecture Notes in Computer Science; vol. 801, Proceedings of the Third European Conference—vol. II on Computer Vision—vol. II, Year of Publication: 1994, 29 Pages.
Lindstrom, et al., "Image-Driven Simplification", Theoretical Computer Science, vol. 262 , Issue 1-2 (Jul. 2001), Year of Publication: 2001, pp. 1-33.
Mishra, et al., "EigenFairing: 3D Model Fairing Using Image Coherence", BMVC 2004, Kingston, Sep. 7-9, 2004, 10 Pages.
"About EarthVision", Dynamic Graphics, Inc., Webpage downloaded on Mar. 3, 2008.

* cited by examiner

*Primary Examiner* — Maurice L McDowell, Jr.

(57) ABSTRACT

Three-dimensional model validation. As a part of the model validation, one or more three-dimensional models of a structure and at least one real world image of the structure is accessed. Features of the one or more three-dimensional models of the structure are combined with features of the at least one real world image of the structure to create a composite model of the structure. The composite model is projected into an imaging plane. The composite model of the structure is compared with at least one of the at least one real world images. Based on the results of the comparing, the accuracy of the one or more three-dimensional models of the structure is determined.

20 Claims, 11 Drawing Sheets

VALIDATING USER GENERATED THREE-DIMENSIONAL MODELS

BACKGROUND

Several 3-D modeling tools have been appeared on the web recently. These tools allow users to author and create 3-D models and then upload them into a database. This database of user-generated models can be published on platforms such as Virtual Earth 3-D which allow a user to visually explore models of structures that may be otherwise inaccessible to a user. The problem with publishing user-generated models is the difficulty in validating the quality and accuracy of such 3-D models. The quality and accuracy shortcomings are related to both the texture and geometry of the model.

The quality of user generated texture that may be provided to a user-generated 3-D model can be determined by comparing the texture provided the 3-D model with an image or photograph of the structure that is modeled by the 3-D model. However, the geometric accuracy of such a user-generated 3-D model cannot be easily calculated. In particular, if another 3-D model is not available to compare to the user-generated model, it is not feasible to determine the accuracy of the user-generated model's geometry.

Moreover, if a base model does exist for comparison, it is neither easy nor computationally efficient to compare two disparate 3-D models of the same structure. This is because comparing two models that have different representations of mesh geometry and texture does not always yield an accurate similarity measure. It should be appreciated that the accuracy of 3-D models depends on basic factors such as: model geometry, texture (the basic matte color or albido of the object) and material properties (shininess, view dependent texture). Estimating the accuracy of a user-generated model's geometry is difficult because it has to be compared with an existing geometrical representation of the structure's surface (which may not be available) and because comparing two disparate geometries can be difficult.

It should be appreciated that the accuracy of a 3-D model's texture depends on the accuracy of the underlying geometry of the 3-D model as well as the accuracy of its representation of the structure's surface-albedo and reflectance. Therefore, accuracy of underlying geometry of the 3-D model is critical to the overall accuracy and quality of a 3-D model.

Any 3-D model validation approach that directly uses textured models for quantifying model accuracy will depend on the user-generated texture. The texture of a user-textured 3-D model depends on various factors: ambient illumination, level of geometrical detail, texture map resolution, surface reflectance, chromatic variations etc.

Additionally, user-contributed texture depends on the image used for texture mapping the model. The image-pixels corresponding to the texture depend on the viewing angle and internal characteristics of the camera used for generating the image. Thus, a 3-D model validation and verification scheme that is based on user-contributed texture will not be reliable and consistent across all models (the models can have viewing angles that are different from the image). Moreover, not all user-generated models will have textures associated with the model geometry. The above cited challenges make it difficult to measure the accuracy of user generated 3-D models for any verification and validation scheme.

Accordingly, the validation of user generated 3-D models has inherent difficulties related to both texture and geometry. Conventional systems do not overcome these difficulties. The user-generated models of many conventional systems are not validated at all. These models are generally published as presented. Consequently, because they possess inadequate validation processes to ensure the accuracy of user generated 3-D models, conventional systems oftentimes publish unreliable user generated 3-D models.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Three dimensional (3-D) modeling tools allow users to create 3-D models of structures and then upload them into a database. The problem with publishing user-generated models is the quality and accuracy shortcomings of these 3-D models related to both the texture and geometry of the model. A methodology for validating a user generated 3-D model based on texture supplied from real world images is disclosed. As a part of the 3-D model validation, one or more 3-D models of a structure and at least one real world image of the structure is accessed. Features of the one or more 3-D models of the structure are combined with features of the at least one real world image of the structure to create a composite 3-D model of the structure. The composite 3-D model of the structure is projected into an imaging plane of one of the real world images. Thereafter, the composite 3-D model of the structure is compared with the real world image in whose image plane it is projected. Based on the results of the comparing, the accuracy of the one or more 3-D models of the structure is determined.

BRIEF DESCRIPTION OF THE DRAWINGS

The accompanying drawings, which are incorporated in and form a part of this specification, illustrate embodiments and, together with the description, serve to explain the principles of the embodiments.

The drawings referred to in this description should not be understood as being drawn to scale except if specifically noted.

DETAILED DESCRIPTION

Reference will now be made in detail to various embodiments, examples of which are illustrated in the accompanying drawings. While descriptions will be provided in conjunction with these embodiments, it will be understood that the descriptions are not intended to limit the scope of the embodiments. On the contrary, the disclosure is intended to cover alternatives, modifications and equivalents, of these embodiments. Furthermore, in the following description, numerous specific details are set forth in order to provide a thorough understanding of embodiments. In other instances, well-known methods, procedures, components, and circuits have not been described in detail as not to unnecessarily obscure aspects of embodiments.

Figure 1A:
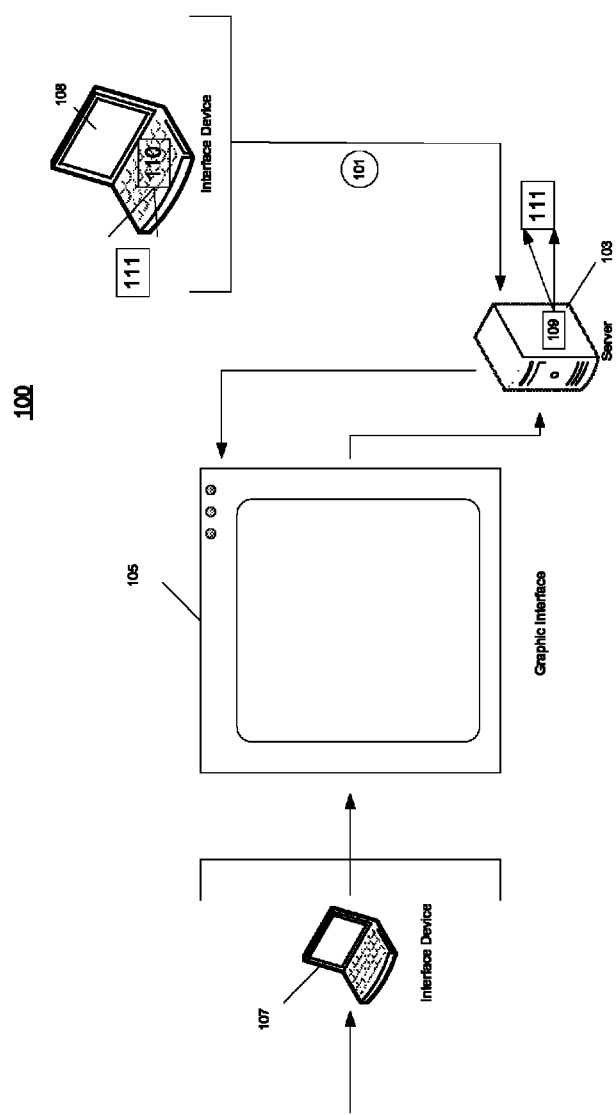
FIG. 1A shows an exemplary operational setting of a component for validating user generated three-dimensional (3-D) models according to one embodiment.

Exemplary Network Setting of System for Validating User Generated Three-Dimensional Models According to Embodiments FIG. 1A shows an exemplary operational setting of a component 111 for validating user generated three-dimensional (3-D) models according to one embodiment. In one embodiment, component 111 uses features of a real world image to generate a 3-D model from a user-generated 3-D model that can be compared to a real world image in order to verify the accuracy of the user-generated 3-D model. Component 111 can operate offline on an individual computer system or can operate as a part of a client server type network. FIG. 1A shows user-generated models 101, server 103, graphic interface 105, interface device 107, interface device 108, 3-D model publishing platform 109, 3-D modeling system 110 and component 111.

Referring to FIG. 1A, 3-D modeling system 110 is a computer program that provides system users a platform to create user generated 3-D models 101. In one embodiment, 3-D modeling system 110 can reside on interface device 108. In another embodiment, 3-D modeling system 110 can reside on server 103. In yet another embodiment, some components of 3-D modeling system 110 can reside on server 103 and other components of 3-D modeling system 110 can reside on interface device 108.

In one embodiment, user generated 3-D models 101 are graphically generated models of structures that can be uploaded to 3-D model publishing platform 109 and stored for retrieval by users of 3-D model publishing platform 109 seeking to view an accurate 3-D model of a particular structure (such as via interface device 107). In an offline embodiment user generated 3-D models 101 can be validated on interface device 108 by component 111 (resident on interface device 108) using processes described herein. In this embodiment, the validated user-generated 3-D model can be stored on interface device 108 and accessed from interface device 108 without any online involvement. In online embodiments, user generated models 101 that are uploaded to 3-D model publishing platform 109 can be either validated or un-validated. In one embodiment, whether the user generated 3-D models are validated or un-validated when uploaded can depend on whether validation is carried out on interface device 108 or on server 103.

Server 103 supports 3-D model publishing services for clients accessing 3-D model publishing platform 109 via client coupled devices such as interface device 107 (e.g., desktop computer, laptop computer, cellular phone, portable navigation assistant with internet accessing capability, etc.). In one embodiment, model publishing platform 109 can reside on server 103. In one embodiment, a user can access model publishing platform 109 via graphic interface 105 which can be presented on interface device 107 and interface device 108.

3-D model publishing platform 109 is an online server based system that provides system users the capacity to browse user-generated 3-D models upon which verification and validation has or can be performed. In one embodiment, as discussed above, 3-D model publishing platform 109 can reside on server 103. In one embodiment, as discussed above, 3-D model publishing platform 109 can be accessed through graphic interface 105 which can be associated with 3-D model publishing platform 109. In one embodiment, a user, such as via interface device 107, can thereby review validated user-generated 3-D models 101 that have been uploaded to 3-D model publishing platform 109.

Component 111 directs validation (e.g., verification of accuracy) of user generated 3-D models. As discussed above, component 111 reliably validates user generated 3-D models using one or more real world images of the structure that is modeled. In one embodiment, as a part of its operation component 111 accesses 3-D models of a structure that are submitted by users. In response, component 111 accesses one or more real world images of the structure for use in its validation operations. In one embodiment, component 111 combines features of the user supplied 3-D model of the structure with features of the at least one real world image of the structure to create a composite model (e.g., a feature mapped model) of the structure. Subsequently, the composite model is projected into an imaging plane of one of the real world images. In one embodiment, the composite model that is projected into an imaging plane of one of the real world images is compared with at least one of the at least one real world images in order to validate the 3-D model.

In one embodiment, component 111 can be a part of 3-D modeling system 110. In another embodiment, component 111 can be separate from 3-D modeling system 110 but operate cooperatively therewith. In one embodiment, component 111 can be a part of 3-D model publishing platform 109. In another embodiment, component 111 can be separate from 3-D model publishing platform 109 but operate cooperatively therewith. It should be appreciated that component 111 or subcomponents thereof can reside on either interface device 108 or server 103 or both. In one embodiment, component 111 or subcomponents thereof can be implemented in software, hardware or a combination of both.

Operation

Figure 1B:
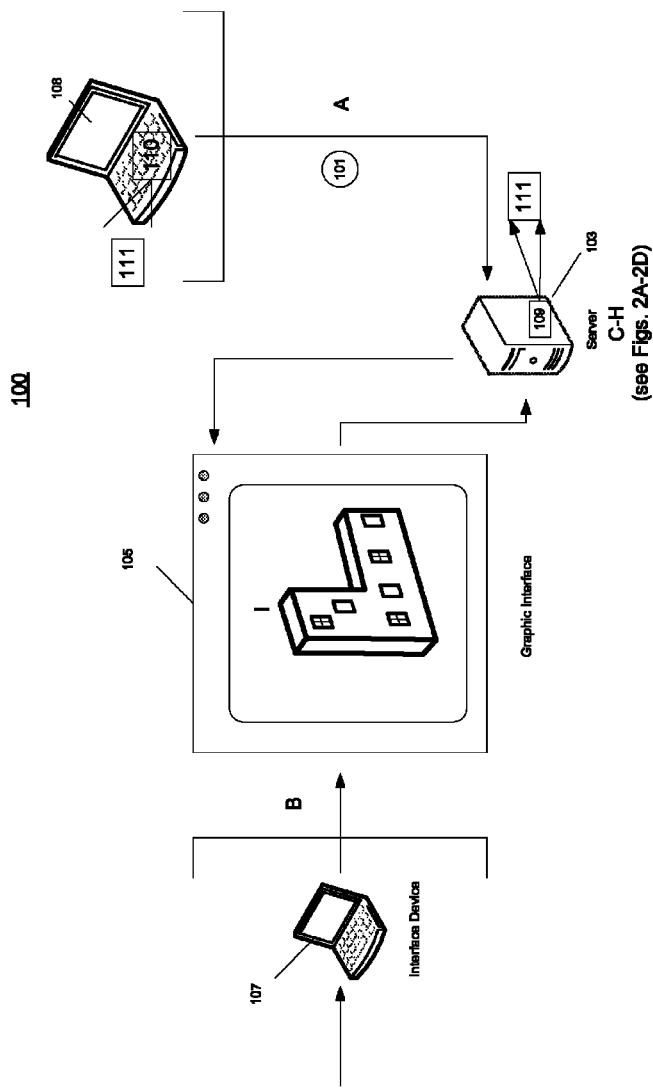
FIG. 1B illustrates operations performed in a user generated 3-D model validation process according to one embodiment.

FIG. 1B illustrates operations A-I performed in a user generated three dimensional (3-D) model validation process according to one embodiment. These operations including the order in which they are presented are only exemplary. In other embodiments, other operations, or subsets of these operations, in other orders can be employed. For example, in one embodiment, 3-D model validation operations C-I (see discussion of FIGS. 2A-2D below) can be performed offline on an individual computer system (e.g., 108 in FIG. 1A).

Referring to FIG. 1B, at A, a user-generated 3-D model 101 of a structure generated on a 3-D modeling system 106 is supplied (such as by uploading) to a 3-D modeling publishing platform 109. Structure 150 in FIG. 2A illustrates an exemplary user generated 3-D model that is to be discussed in conjunction with these descriptions of exemplary operations.

Referring again to FIG. 1B, at B, an uploaded 3-D model (e.g., 150 of FIG. 2A) of the structure is elicited by a user of 3-D modeling publishing platform 109 desiring to view an accurate 3-D model of the structure via interface device 107. Operations C-H are described with reference to FIGS. 2A-2D.

Figure 2A:
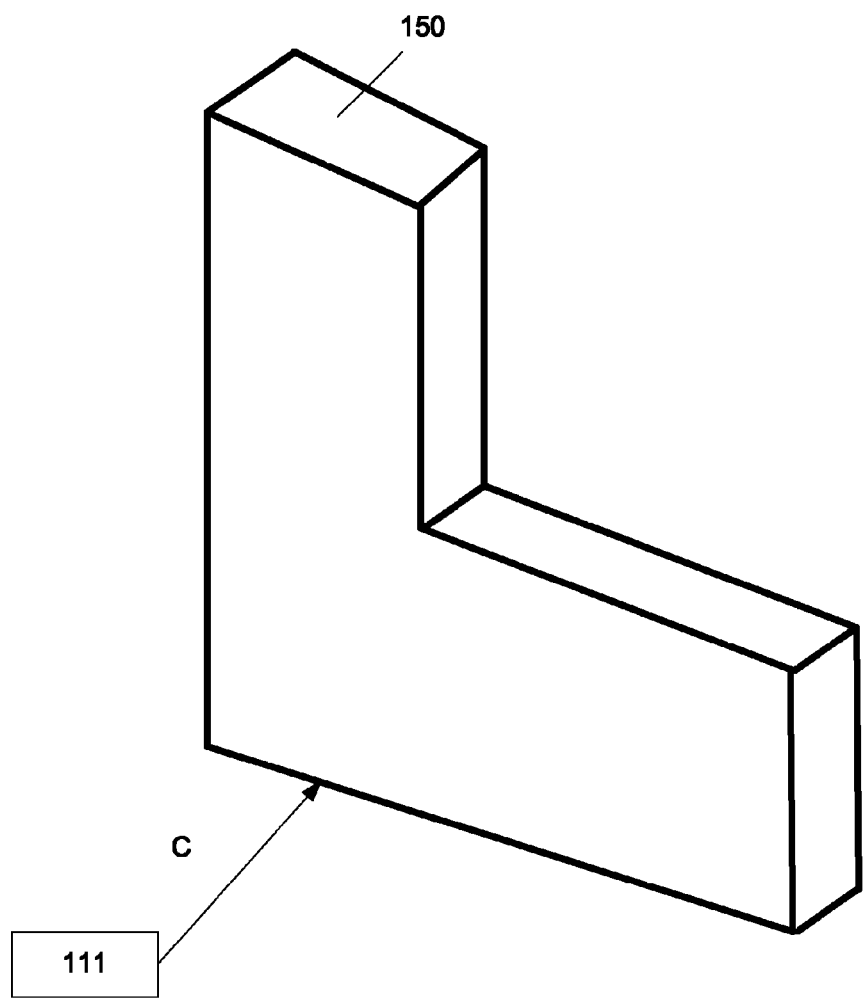
FIG. 2A shows an exemplary user-generated 3-D model according to one embodiment.

Referring now to FIG. 2A, at C, the 3-D model (e.g., 150 of FIG. 2A) that is elicited by the user is accessed by component 111.

Figure 2B:
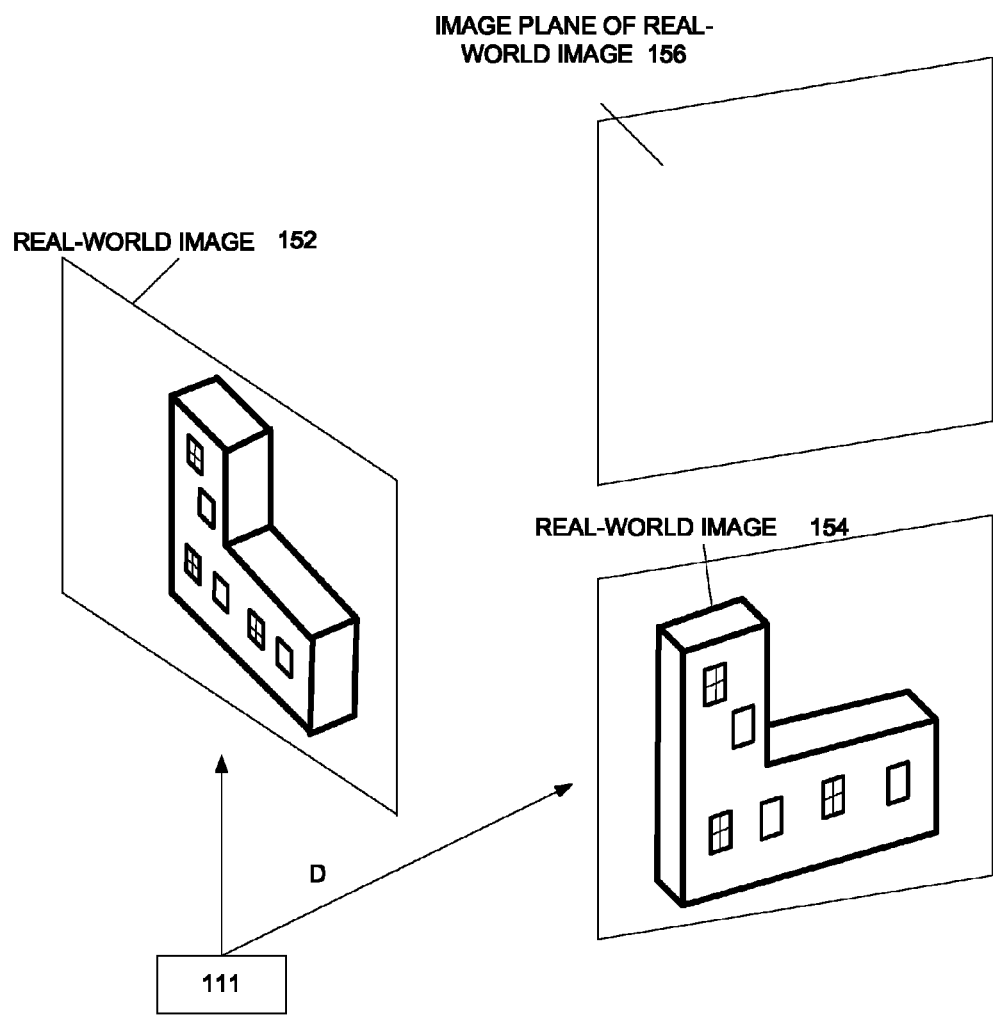
FIG. 2B shows two real world images and a real world image plane of one of the real world images according to one embodiment.

Referring to FIG. 2B, at D, component 111 accesses real world images of the structure. This is illustrated in FIG. 2B where real world image 152 and 154 are accessed by component 111. FIG. 2B also shows the image plane 156 of real world image 154.

Figure 2C:
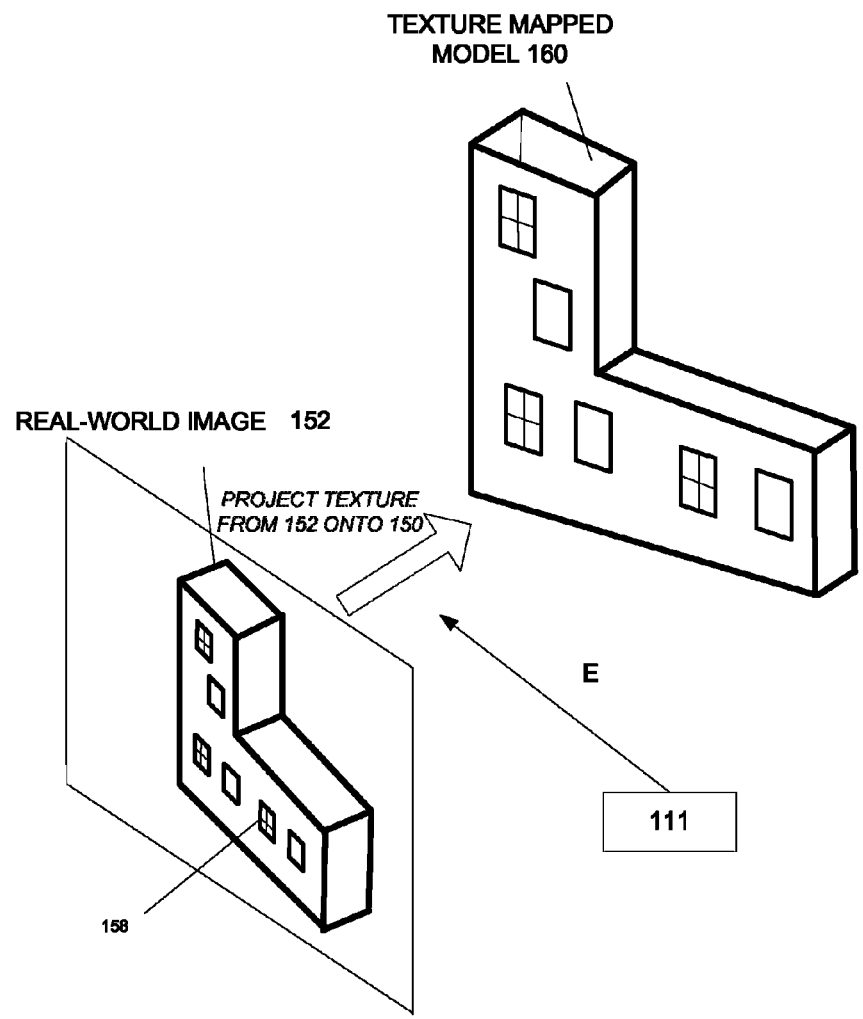
FIG. 2C illustrates the texture mapping of a user-generated 3-D model with features of a real world image according to one embodiment.

Referring to FIG. 2C, at E, textural features 158 of the real world image 152 that are accessed by component 111 are texture mapped onto the user generated 3-D model 150 to create a composite model 160 (e.g., texture mapped model).

Figure 2D:
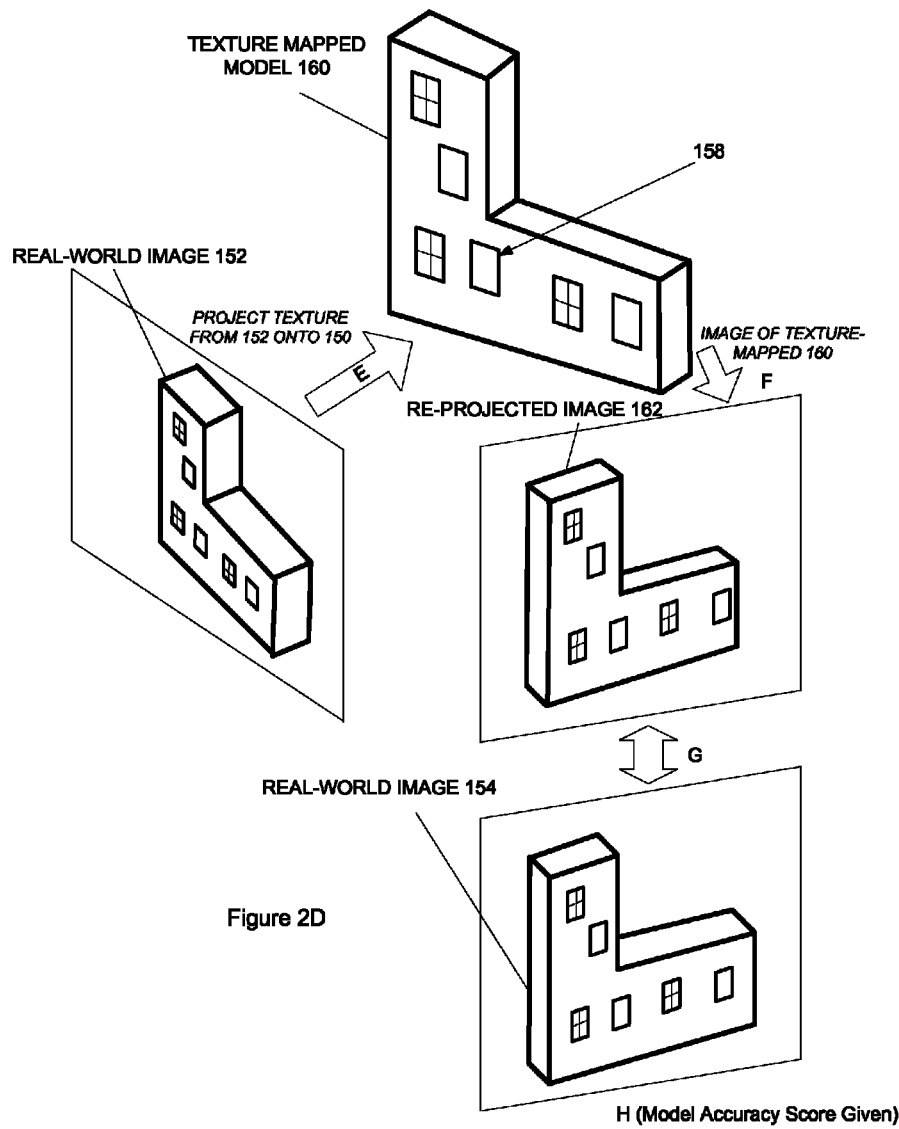
FIG. 2D illustrates the re-projection of a texture mapped model of a user-generated 3-D model into an image plane of a real world image according to one embodiment.

Referring to FIG. 2D, at F, the composite model 158 is projected into an image plane 156 of real world image 154.

At G, the projection 162 (e.g., re-projected image 162) of the composite model 160 into the image plane 156 provided from real world image 154 is compared to real world image 154 using image coherence metrics (discussed in detail herein below).

At H, based on the comparison performed at G, the user generated 3-D model is accorded a score.

Referring again to FIG. 1B, at I, the user generated model with the highest score is presented to the user on interface device 107 via graphic interface 105.

Exemplary Implementation Details

Online 3-D model publishing platforms (e.g., 109 in FIGS. 1A and 1B), allow user-generated 3-D models of structures to be uploaded to a common 3-D model repository. Such structures can include but are not limited to, houses, buildings, statues, facades, and sculptures. This functionality enables the publication of new models of structures that haven't been modeled in the past in addition to alternate models of the same structure. Moreover, different users can create their own 3-D models of the same structure and add them to the 3-D model repository.

However, user-generated 3-D models need to be verified for their accuracy and quality. Reliable verification requires that a user-generated 3-D model be compared with existing or observed data. Verification methodologies that attempt to compare a user-generated 3-D model with an already existing 3-D model may not be feasible. This is because such an approach requires that: (1) the existing 3-D model is accurate (which would actually make the generation of the new 3-D model unnecessary) and (2) that there is a measure that enables the 3-D models to be easily compared. Moreover, it would be difficult to ascertain which of the two models better represents the real-world structure unless both of them can be compared to a different modality of data.

In one embodiment, the accuracy and quality of user-generated 3-D models can be determined by comparing them with what is observed in corresponding images or photographs. It should be appreciated that an accurate user-generated 3-D model of a structure has to best represent what is observed in images or photographs of the structure. That is to say, a 3-D model that best captures the geometry of the structure will be closer to reality and therefore, will best match what is viewed in images.

Figure 3A:
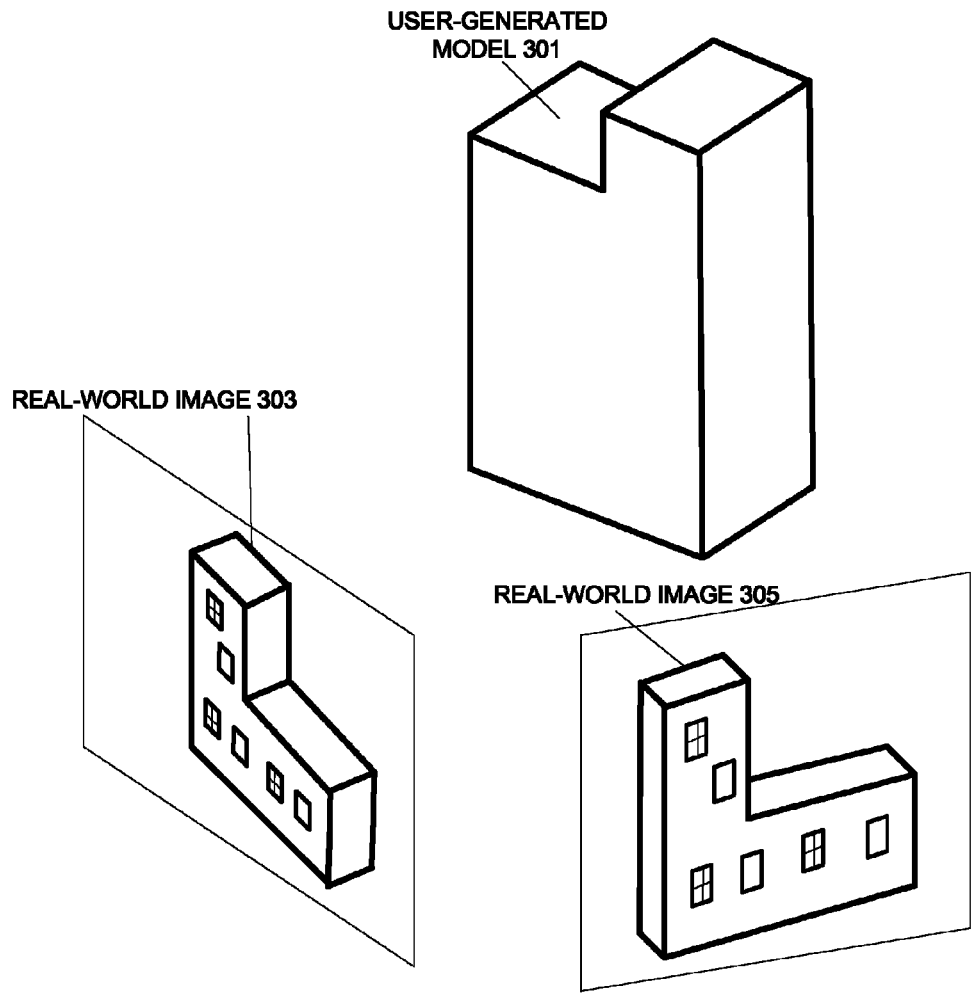
FIG. 3A shows a user-generated 3-D model and two real world images according to one embodiment.
Figure 3B:
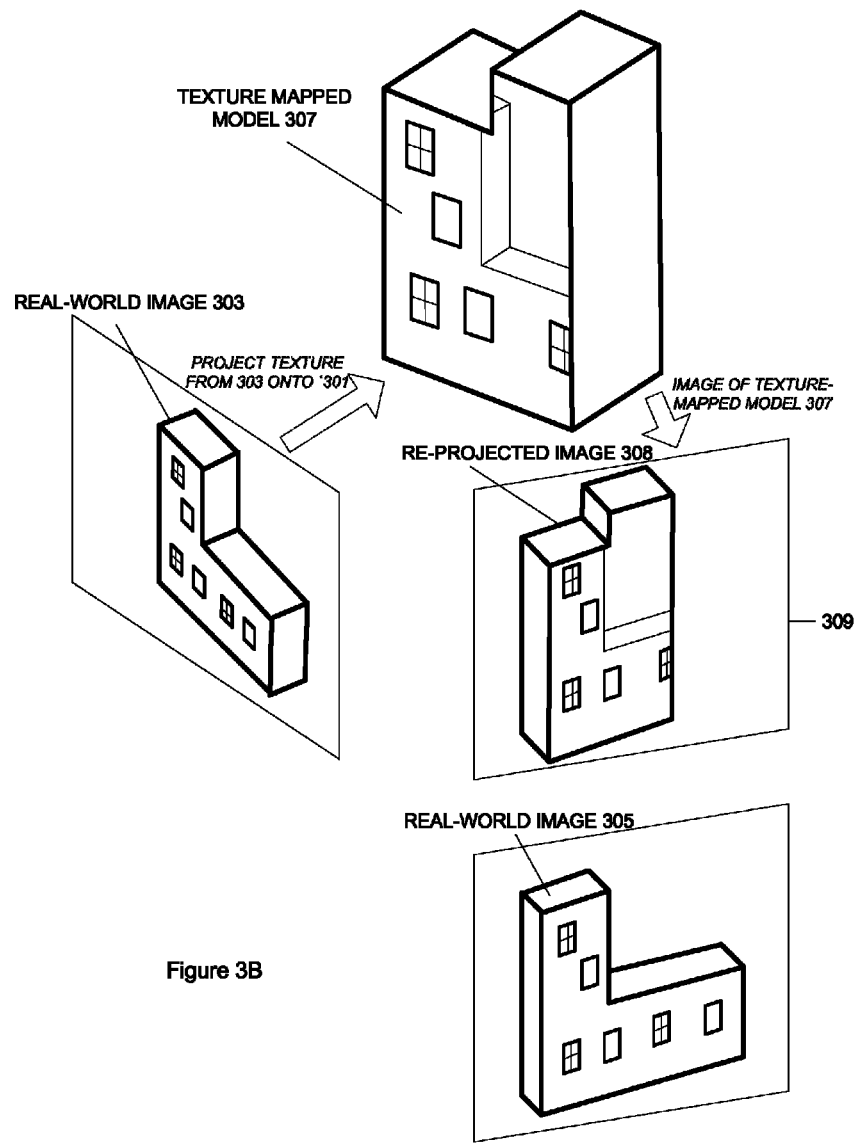
FIG. 3B shows a texture mapped model of a user generated 3-D model projected onto the image plane of a real world image according to one embodiment.

FIG. 3A shows a user-generated 3-D model 301, which may or may not accurately depict the actual structure it attempts to represent. For simplicity, consider two real-world images of the same structure, real world image 303 and real world image 305. In one embodiment, more than two images can be used but in this example two images are considered for purposes of clarity and brevity. Referring now to FIG. 3B, therein is shown a texture mapped model 307 of user generated 3-D model 301 projected onto the image plane 309 of real world image 305. As shown in FIG. 3B, although the user-generated model is provided with an authentic texture and is projected onto the actual plane 309 of real world image 305, a comparison reveals striking dissimilarities between the re-projected image 308 and that of real world image 305. The dissimilarities indicate that the user-generated 3-D model 301 is not accurate, as it is expected that the provision of an accurate user-generated model with an authentic texture of the modeled structure and the subsequent projection of the textured model into the plane of a known image of the structure would produce a model that has a similar appearance to that of the known image of the structure.

More specifically, a comparison of user-generated 3-D model 301 and real world image 305 indicates that user-generated 3-D model 301 of the modeled structure is different from the actual structure that is observed in real world images 303 and 305. It should be appreciated that because camera parameters, positions, and orientations that correspond to both images are known the images can be projected onto any desired 3-D surface and texture-mapped models can be projected back into the images as discussed above.

Referring again to FIG. 3B, user-generated 3-D model 301 is texture mapped with surface details of real world image 303, e.g., surface details of real world image 303 are projected onto the faces of the user-generated 3-D model. The texture-mapped model 308 is then projected onto the imaging plane 309 of real world image 305 to create re-projected image 308. Re-projected Image 308 is the image of the texture-mapped model as viewed from the same camera position and orientation and with the same camera parameters as real world image 305. If the user-generated 3-D model 301 embodied an accurate representation of the geometry of the structure at issue the projection of texture from real world image 303 to user-generated 3-D model 301 would have aligned well with the user-generated model's geometry. Moreover, the view of texture mapped model 307 from the perspective of real world image 305 would have generated the same image as is provided by real world image 305. More specifically, re-projected image 308 and real-world image 305 would be the same for accurate geometry of user-generated 3-D model 301.

The uploading of an inaccurate or poor model as discussed above with reference to FIG. 3A and FIG. 3B, is contrasted with the uploading of an accurate or more accurate model as described above with reference to FIGS. 2A-2D. Referring to FIG. 2A, as discussed above the user-generated 3-D model 150 of the modeled structure proved to be similar in appearance to the actual real-world structure. Therefore, the re-projected image 162 (see FIG. 2D) proved to be similar in appearance to real world image 154. FIG. 2D illustrates how accurate geometrical modeling by users results in precise texture-mapping of the user-generated 3-D models and generation of re-projected images that are similar in appearance to the original images. In one embodiment, user-generated model 150 of FIG. 2A would be given a higher score than user-generated model 301 of FIG. 3A. Consequently, user generated model 150 could be presented to a customer using 3-D model publishing platform 109 of FIG. 1B (instead of user generated model 301 of FIG. 3A) desiring to view a 3-D model of the modeled structure.

The use of image-based textural cues to quantify the geometrical accuracy of user generated 3-D models is an aspect of exemplary embodiments. In one embodiment, a variety of distance measures can be used to assess the similarity between a re-projected image (e.g., 162 in FIG. 2D) and a real-world image (e.g., 154 in FIG. 2D). For example, using the example shown in FIG. 2D, if images 152 and 154 are taken at the same time or in the same session under similar lighting conditions with the same camera, then difference quantifying techniques that include but are not limited to: (1) sum-of-squared differences (SSD), (2) Euclidean distance mapping (EDM), or (3) root-mean-square (RMS) of the gray-level or color differences can be used to quantify the similarity between re-projected image 162 and real world image 154.

Other distance measures that can be used include but are not limited to: (1) RMS of gradient directions (invariant to changes of illumination between the different images used for the comparison), (2) feature-based matching (includes distance measures based on shape context descriptors), (3) affine-invariant descriptors, and features derived from image patches or segmented groups of pixels, (4) mutual information or entropy-based similarity measures (quantify statistical dependence between pixel intensities of the two images) and (5) texture-based similarity measures (include cumulative histograms, gabor filters, steerable pyramids, and other measures that quantify similarity of texture patches).

In one embodiment, the accuracy of a user generated 3-D model can be quantified as a function of the similarity between the re-projected images and the actual images. For example, if a user generated 3-D model M is texture mapped using an image A or $I_A$ to generate a texture-mapped model $M_A$, after texture-mapping, $M_A$ can be then re-projected into image B's viewpoint to generate a re-projected image, $I_B(M_A)$. Accordingly, the model accuracy can be quantified using the following equation:

$$Q(M)=\rho(I_B(M_A), I_B)$$

where $\rho$ is the similarity measure between two images. However, the model accuracy must include the other component of the herein described modeling process whereby image B textures the user generated model M and the created textured model $M_B$ is re-projected back into $I_A$ to yield $I_A(M_B)$:

$$Q(M)=\rho(I_B(M_A), I_B)+\rho(I_A(M_B), I_A)$$

For a set, S, of multiple real-world images, model accuracy includes all pair-wise re-projection measures:

$$Q(M)=\Sigma_{All\ image\ pairs} I_A, I_B[\rho(I_B(M_A), I_B)+\rho(I_A(M_B), I_A)]$$

In one embodiment, the similarity measure $\rho$ between two images can be any of the measures mentioned above. It can also include a robust error norm that weighs the difference in the similarity measure so that outliers can be rejected. In one embodiment, robust error norms utilized can include but are not limited to Lorentzian, Geman and McClure, and Tukey's biweight functions.

In one embodiment, differences between the images taken from different directions can be used to assess not only user-generated model geometry, but also user-generated model reflectance properties (e.g., materials). For example, if part of a user-generated model is metal or glass, it can look very different from different view directions; matching these view-dependent properties to the ones exhibited in the real-world images can be used for verifying view-dependent parameters of user-generated models such as reflectance.

Exemplary Advantages

Advantages of exemplary embodiments include validation of user-generated 3-D models using real-world images which is not done by conventional methodologies. Exemplary embodiments, quantify the accuracy of a user-generated 3-D model's geometry without having to compare it with another user-generated 3-D model. In one embodiment, the accuracy of geometry can be determined by using pixels of 2-D images. It should be appreciated that image-based model simplification and refinement (as opposed to validation) has existed in several forms. For example, models have been simplified by manipulating their mesh representation. However, texture-mapping a model from one image and re-projecting it onto another image to form a reference that can be used to verify the accuracy of model geometry, especially models generated and contributed by users, is not provided by conventional systems. In one embodiment, models can be generated by laser-scans and the images can be synthetically generated for different views of those models. In other embodiments, models and images generated in other manners can be used.

It should be appreciated that 3-D models that feature conventional user-contributed texture cannot be easily compared with real-world images. In one embodiment, in order to validate and verify model geometry, aerial, bird's eye, or street side images can be used to texture map and re-project models into images, which in turn provides a reference that can be used to quantify the geometrical accuracy of the model. Exemplary embodiments can be employed to validate other properties of models as well, these include but are not limited to surface reflectance, albedo, occluding and occluded parts or objects, geometrical detail, and view dependency. Moreover, exemplary embodiments provide wide applicability without loss of robustness.

Figure 4:
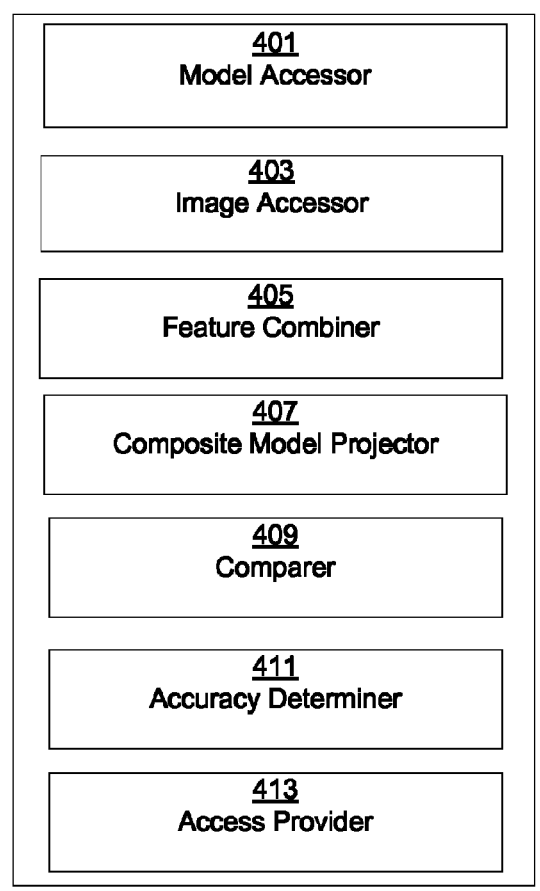
FIG. 4 shows a system for validating user generated 3-D models according to one embodiment.

Subcomponents of Component for Validating User Generated Three-Dimensional Models According to Embodiments FIG. 4 shows subcomponents of component 111 for validating user generated three-dimensional (3-D) models according to one embodiment. In one embodiment, component 111 implements an algorithm for validating user generated three-dimensional (3-D) models. In the FIG. 4 embodiment, component 111 includes model accessor 401, image accessor 403, combiner 405, projector 407, comparer 409, accuracy determiner 411 and access provider 413.

It should be appreciated that aforementioned subcomponents of component 111 can be implemented in hardware or software or in a combination of both. In one embodiment, subcomponents and operations of components 111 can be encompassed by components and operations of one or more computer programs (e.g. 3-D modeling system). In another embodiment, subcomponents and operations of component 111 can be separate from the aforementioned one or more computer programs but can operate cooperatively with components and operations thereof.

Referring to FIG. 4, model accessor 401 accesses one or more user generated 3-D models of a structure. In one embodiment, users can generate the 3-D models using a modeling system that provides users a platform to create user generated 3-D models.

Image accessor 403 accesses at least one real world image of the structure. In one embodiment, the real world images that are accessed by image accessor 403 are two-dimensional images of real world structures. In one embodiment, the real world images that are accessed can provide texture that can be projected into a 3-D model or can provide an image plane of the structure into which a 3-D model can be projected.

Feature combiner 405 combines features of the one or more user generated 3-D models of the modeled structure with features of the at least one real world image of the modeled structure to create a composite model of the modeled structure. In one embodiment, features of the one or more user generated 3-D models of the modeled structure are combined with features of the at least one real world image of the modeled structure by projecting the features of a real world image into a 3-D model of the modeled structure. In one embodiment, the features of the at least one real world image of the modeled structure can include textural features.

Composite model projector 407 projects the composite model into an imaging plane. In one embodiment, the image plane into which the composite model is projected can include an imaging plane of a real world image of the modeled structure.

Comparer 409 compares the composite model of said structure with at least one of the at least one real world images. In one embodiment, a variety of distance measures can be used to compare or assess the similarity between a re-projected image and a real-world image. In one embodiment, difference quantifying techniques that can be used to assess the similarity between a re-projected image and a real-world image can include but are not limited to: (1) sum-of-squared differences (SSD), (2) Euclidean distance mapping (EDM), or (3) root-mean-square (RMS) of the gray-level or color differences can be used to quantify the similarity between images.

Accuracy determiner 411 determines, based on the above discussed similarity assessment, the accuracy of the one or more 3-D models of the structure. In one embodiment, accuracy determiner 411 ranks models according to the assessed similarity with a real world image as discussed above (according to a score). Access provider 413 provides access to the user generated 3-D model that is determined to be most accurate for presentation to system users (e.g., users of systems 109 and/or 110 in FIG. 1A).

Figure 5:
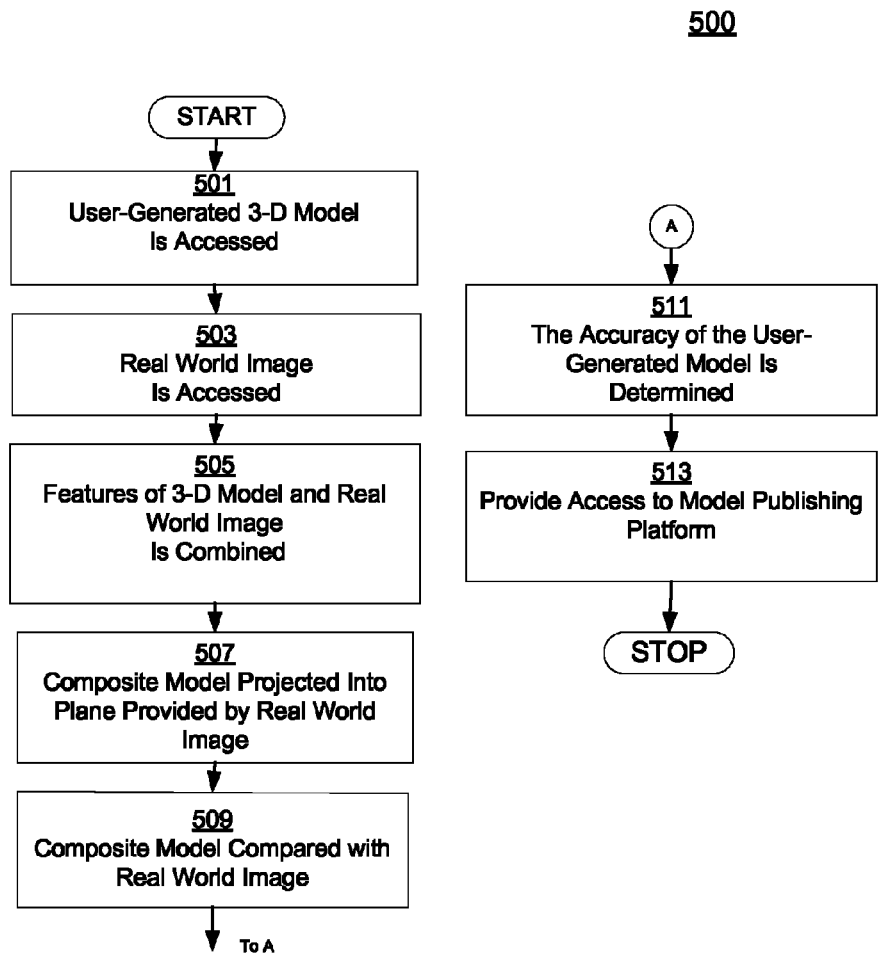
FIG. 5 shows a flowchart of the steps performed in a method for validating user-generated 3-D models according to one embodiment.

Exemplary Operations of Method for Validating User Generated Three-Dimensional Models According to Embodiments FIG. 5 shows a flowchart 500 of the steps performed in a method for validating user-generated (3-D) three-dimensional models according to one embodiment. The flowchart includes processes that, in one embodiment can be carried out by processors and electrical components under the control of computer-readable and computer-executable instructions. Although specific steps are disclosed in the flowcharts, such steps are exemplary. That is the present invention is well suited to performing various other steps or variations of the steps recited in the flowcharts. Within various embodiments, it should be appreciated that the steps of the flowcharts can be performed by software, by hardware or by a combination of both.

Referring to FIG. 5, at step 501 one or more user-generated 3-D models are accessed. In one embodiment, the one or more user generated 3-D models can be generated by a user using a 3-D model modeling system.

At step 503, at least one real world image is accessed. In one embodiment, the real world images that are accessed can provide texture that can be projected into a 3-D model and can provide an image plane of the structure into which a 3-D model can be projected.

At step 505, features of the 3-D model and real world image are combined. In one embodiment, features of the one or more 3-D models of the modeled structure are combined with features of the at least one real world image of the modeled structure by projecting the features of a real world image into a 3-D model of the modeled structure. In one embodiment, the features of the at least one real world image of the modeled structure can include textural features. In one embodiment, features a real world image can be texture mapped onto the one or more 3-D models.

At step 507, a composite 3-D model is projected into a plane provided by an accessed real world image. In one embodiment, the composite 3-D model is a texture mapped 3-D model. In one embodiment, the imaging plane into which the composite model is projected can include an imaging plane of a real world image of the modeled structure.

At step 509, the re-projected composite model is compared with a real world image. In one embodiment, a variety of distance measures can be used to compare or assess the similarity between a re-projected image and a real-world image. In one embodiment, difference quantifying techniques that can be used to assess the similarity between a re-projected image and a real-world image can include but are not limited to: (1) sum-of-squared differences (SSD), (2) Euclidean distance mapping (EDM), or (3) root-mean-square (RMS) of the gray-level or color differences can be used to quantify the similarity between image B1 and image B or image B2 and image B.

At step 511, the accuracy of the one or more user-generated models is determined. In one embodiment, based on the differences that are determined through the comparisons discussed above, a score is accorded each of the one or more 3-D models.

At step 513, access is provided to the 3-D model with the highest score for presentation on a display.

Figure 6:
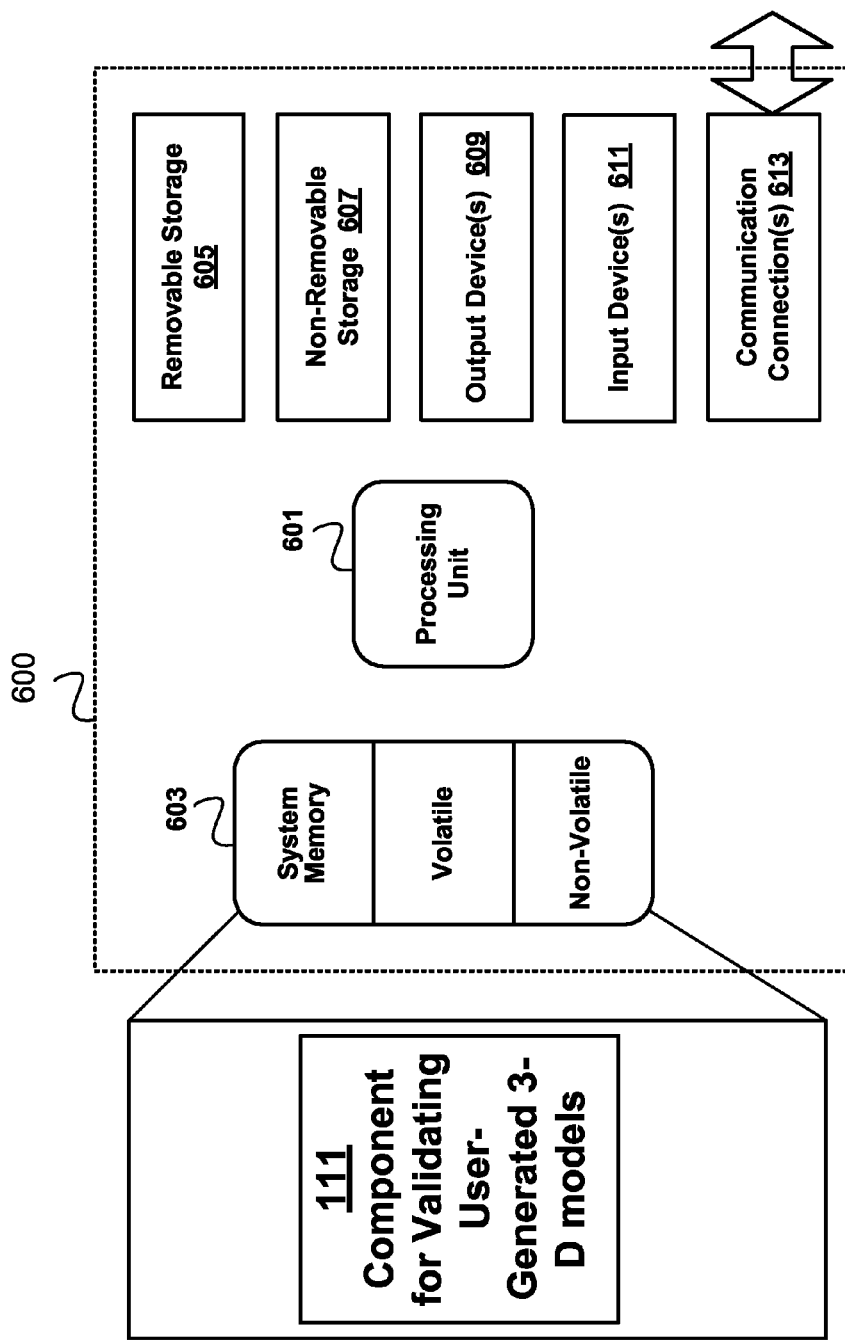
FIG. 6 shows an exemplary computing device according to one embodiment.

Exemplary Hardware Operating Environment of Component for Validating User Generated Three-Dimensional Models According to One Embodiment FIG. 6 shows an exemplary computing device 600 according to one embodiment. Referring to FIG. 6, computing device 600 can be included as a part of a server (e.g., server 103 in FIG. 1A) and/or an interface device (interface devices 107 and 108 in FIG. 1A) in accordance with one embodiment. Computing device 600 typically includes at least some form of computer readable media. Computer readable media can be any available media that can be accessed by computing device 600 and can include but is not limited to computer storage media.

In its most basic configuration, computing device 600 typically includes processing unit 601 and system memory 603. Depending on the exact configuration and type of computing device 600 that is used, system memory 603 can include volatile (such as RAM) and non-volatile (such as ROM, flash memory, etc.) elements or some combination of the two. In one embodiment, as shown in FIG. 6, component for validating user-generated 3-D models 111 (see description of component 111 made with reference to FIG. 1A) can reside in system memory 603.

Additionally, computing device 600, especially the version that can be a part of server 103 in FIG. 1A, can include mass storage systems (removable 605 and/or non-removable 607) such as magnetic or optical disks or tape. Similarly, computing device 600 can include input devices 611 and/or output devices 609 (e.g., such as a display). Additionally, computing device 600 can include network connections 613 to other devices, computers, networks, servers, etc. using either wired or wireless media. As all of these devices are well known in the art, they need not be discussed in detail.

With reference to exemplary details thereof, three-dimensional model validation is disclosed. As a part of the model validation, one or more three-dimensional models of a structure and at least one real world image of the structure is accessed. Features of the one or more three-dimensional models of the structure are combined with features of the at least one real world image of the structure to create a composite model of the structure. The composite model is projected into an imaging plane. The composite model of the structure is compared with at least one of the at least one real world images. Based on the results of the comparing, the accuracy of the one or more three-dimensional models of the structure is determined.

The foregoing descriptions of specific embodiments have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for validating the accuracy of three-dimensional models, comprising:
   accessing one or more three-dimensional models of a structure;
   accessing at least one real world image of said structure wherein said at least one real world image has an imaging plane;
   combining features of said one or more three-dimensional models of said structure with features of said at least one real world image of said structure to create a composite model of said structure wherein said composite model comprises features of a three-dimensional model of said structure and features of a real world image of said structure;
   projecting said composite model into said imaging plane of said at least one real world image;
   comparing said composite model of said structure that is projected into said imaging plane of said at least one real world image with at least one of said at least one real world images; and
   based on said comparing, determining the accuracy of said one or more three-dimensional models of said structure.

2. The method of claim 1 further comprising:
   selecting a three-dimensional model of said one or more three-dimensional models that is most accurate; and
   providing access to said three-dimensional model that is most accurate for presentation on a display.

3. The method of claim 2 wherein said selecting a three-dimensional model of said one or more three-dimensional models that is most accurate is based on image-coherence metrics.

4. The method of claim 2 further comprising verifying and selecting user-generated data for publishing on three-dimensional platforms and databases using image-coherent metrics.

5. The method of claim 2 further comprising:
   providing cues and quality metrics to a three-dimensional model generating system for use in a modeling process that are based on said determining of the accuracy of said one or more three-dimensional model.

6. The method of claim 5 wherein said modeling process uses image-based metrics to contribute to the accuracy and quality of three-dimensional models.

7. The method of claim 1 wherein the geometric accuracy of said three-dimensional model is quantified base on texture-based metrics.

8. A method for three-dimensional model validation, comprising:
   accessing one or more three-dimensional models of a structure and at least one real world image of said structure;
   mapping features of said at least one real world image of said structure onto features of said one or more three-dimensional models of said structure to create a feature mapped model of said structure wherein said feature mapped model comprises features of a three-dimensional model of said structure and features of a real world image of said structure;
   placing said feature mapped model into an imaging plane of one of said at least one real world image;
   comparing said feature mapped model of said structure that is placed into the imaging plane of said at least one real world image with said one of said at least one real world image; and
   based on said comparing, determining the accuracy of said one or more three-dimensional models of said structure, wherein a score is associated with said one or more three-dimensional models.

9. The method of claim 8 further comprising:
   selecting a three-dimensional model of said one or more three-dimensional models based on said score; and
   providing access to the selected three-dimensional model for presentation on a display.

10. The method of claim 9 wherein said selecting a three-dimensional model of said one or more three-dimensional models that is most accurate is based on image-coherence metrics.

11. The method of claim 9 further comprising:
    providing cues and quality metrics to a three-dimensional model generating system for use in a modeling process that are based on said determining of the accuracy of said one or more three-dimensional model.

12. The method of claim 11 wherein said modeling process uses image-based metrics to contribute to the accuracy and quality of three-dimensional models.

13. The method of claim 8 further comprising verifying and selecting user-generated data for publishing on three-dimensional platforms and databases using image-coherent metrics.

14. The method of claim 8 wherein the geometric accuracy of said three-dimensional model is quantified base on texture-based metrics.

15. A tangible computer-readable medium having computer-executable components, comprising:
    a model accessing component for accessing one or more three-dimensional models of a structure;
    an image accessing component for accessing at least one real world image of said structure wherein said at least one real world image has an imaging plane;
    a feature combining component for combining features of said one or more three-dimensional models of said structure with features of said at least one real world image of said structure to create a composite model of said structure wherein said composite model comprises features of a three-dimensional model of said structure and features of a real world image of said structure;

a model projecting component for projecting said composite model into said imaging plane of said at least one real world image;

a comparing component for comparing said composite model of said structure that is projected into said imaging plane of said at least one real world image with at least one of said at least one real world images; and an accuracy determining component for determining the accuracy of said one or more three-dimensional models of said structure based on said comparing.

16. The medium of claim 15 further comprising:

a model selecting component for selecting a three-dimensional model of said one or more three-dimensional models that is most accurate.

17. The medium of claim 16 wherein said selecting a three-dimensional model of said one or more three-dimensional models that is most accurate is based on image-coherence metrics.

18. The medium of claim 16 further comprising:

an access providing component for providing access to said three-dimensional model that is most accurate to a three-dimensional model publishing platform.

19. The medium of claim 16 further comprising:

a cue providing component for providing cues and quality metrics to a three-dimensional model generating system for use in a modeling process that are based on said determining of the accuracy of said one or more three-dimensional model.

20. The medium of claim 15 wherein said determining said accuracy of said one or more three-dimensional models is based on image-coherence metrics.

* * * * *